Sept. 26, 1950 W. McCANDLESS 2,523,993
DIRECT CURRENT THREE-PHASE ALTERNATING
CURRENT CONVERTER
Filed July 25, 1947 2 Sheets-Sheet 1

INVENTOR.
WILLIAM McCANDLESS
BY
Falvey, Souther & Stottenburg
ATTORNEYS

Sept. 26, 1950    W. McCANDLESS    2,523,993
DIRECT CURRENT THREE-PHASE ALTERNATING
CURRENT CONVERTER Filed July 25, 1947    2 Sheets-Sheet 2

INVENTOR.
WILLIAM McCANDLESS
BY
Falvey, Souther & Stoltenberg
ATTORNEYS

Patented Sept. 26, 1950

2,523,993

UNITED STATES PATENT OFFICE 2,523,993

DIRECT CURRENT TO THREE-PHASE ALTERNATING CURRENT CONVERTER

William McCandless, Toledo, Ohio

Application July 25, 1947, Serial No. 763,546

8 Claims. (Cl. 321—49)

This invention relates to speedometers, more particularly to a speedometer of an electrical type which is adapted to be installed as original factory equipment on automotive vehicles regardless of the position of the engine thereof or the position of the moving element of the vehicle from which the speed indications are initiated, or the position of the station to which the speed indications are transmitted and displayed to the operator.

The invention contemplates the provision of an improved electrical speedometer device which is energized from a direct current source by an initiating or translating device which cooperates with a moving part of the vehicle to translate the direct current into polyphase alternating currents which are transmitted to the receiving end where the polyphase alternating currents are utilized to drive an electric motor. The electric motor, in turn, drives the rotating magnets of an eddy current speed cup device which moves an indicating pointer in a measure having a relation to the speed of the moving part of the vehicle which initiated the polyphase alternating currents driving the electric motor.

The invention further contemplates providing an electrical speedometer device which obviates the use of contact points for telemetering, to a distant point, information relating to the speed and to the distance traversed by the vehicle to which the device is attached.

The invention further contemplates the provision of an electrical speedomter device utilizing polyphase currents to drive an electric motor which will indicate both the speed of the vehicle and also the distance traversed by the vehicle.

The invention further contemplates providing a construction of an electrical speedometer which is rugged and which is suitable for mass production.

It is, therefore, a principal object of this invention to provide an improved electrical speedometer which utilizes polyphase alternating currents from translated direct current, in which the polyphase alternating currents are utilized to drive an electric motor, which will, in turn, drive devices indicating speed and also distance traversed by the vehicle.

It is a further object of this invention to provide mechanical improvements of speedometer devices which will facilitate its fabrication in a mass production line and which will be rugged under service conditions.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings.

Figure 5:
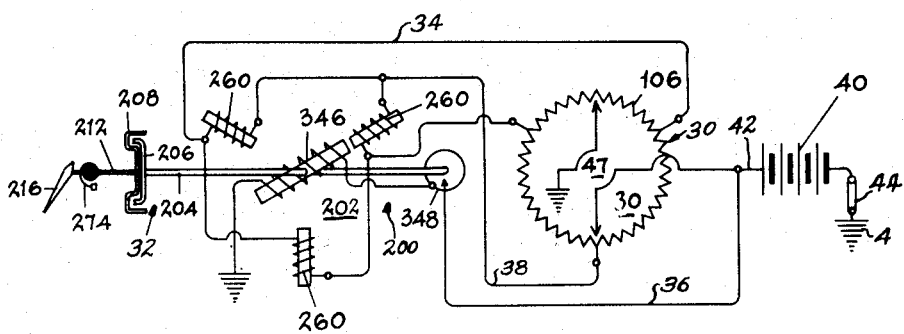
Fig. 5 is a schematic diagram of connections of an electrical circuit in which the invention is incorporated.

Referring to the drawings, particularly to Fig. 5, an initiating device or translater 30 is shown cooperating with a receiver or indicating device 32 and interconnected therewith by electrical conductors 34, 36, and 38. Electrical energy is supplied to the initiating device 30 by a storage battery 40 of the motor vehicle, to which the electrical speedometer of the invention is attached, and is connected thereto by means of conductor 42 which is controlled by a manual switch 44 such as, for example, the ignition switch of the vehicle. One side of the battery 40 is grounded at 46 and the circuit is completed by grounding the casing of the initiating device as shown.

The moving part or rotor 47 of the initiating device 30 is rotated by means of a flexible cable 50, operatively connected thereto, one end of which is connected to the rotor 47 (Fig. 1) and the other end to a moving part 48 of the vehicle which rotates in a proportional relationship to the ground speed of the vehicle. The driving connections between the rotor 47 and the moving part 48 of the vehicle may comprise a flexible cable such as presently used in connection with speedometers of automotive vehicles and, being well known in the art, need not be described in further detail herein.

In the initiating device 30, a rotor 47 is provided comprising a head 52 of insulating material fixedly attached to a stub shaft 54, journaled in a metallic casing member 56 and is adapted to be driven by the flexible shaft as already described. The flexible shaft 50 is conveniently held in cooperative relation with the casing member 56 by a threaded counter-bore 58 with which a proper nipple (not shown) cooperates to hold the members in operative relation. The head 52 of the rotor is provided with a flange 60 which cooperates with and over-hangs a casing portion 62 to prevent ingress of oil lubricating the shaft 54 into the interior of the casing member 56 of the initiating unit.

Figures 2, 3:
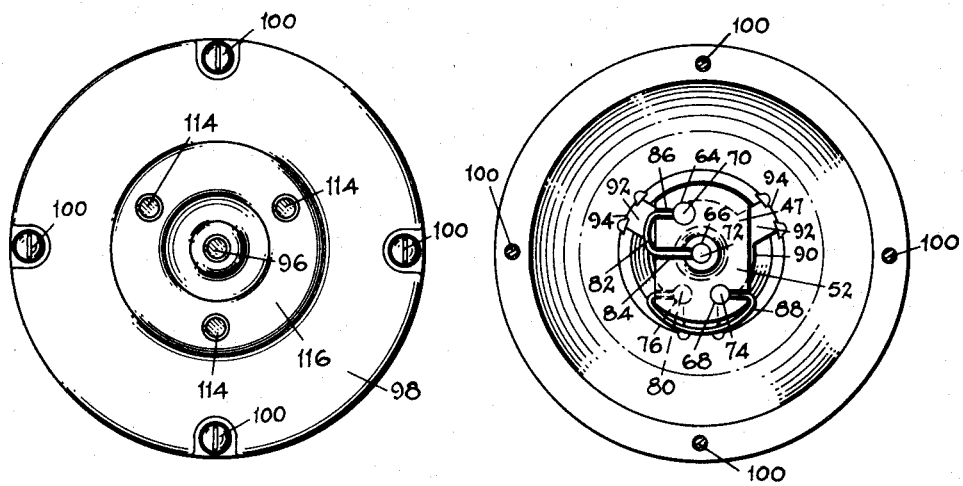
Fig. 2 is an elevational view of the forward face of the device shown in Fig. 1.
Fig. 3 is an elevational view of the device shown in Fig. 1 with the cover removed.

Referring now to Fig. 3, the head of the rotor 52 is provided in its forward face with three aligned apertures 64, 66, and 68, in which are mounted spring-pressed brushes 70, 72, and 74. The head is also provided with a recess 76 (Fig. 3) on its face 78, in which is positioned a fourth spring-pressed brush member 80. The central brush 72 is mounted on the longitudinal axis of the rotor, concentric with the shaft 54, and is connected with brush 70 by means of a conductor 82 which is fitted into slot 84 extending from the apertures 66 to the exterior of the head and into slot 86 extending from the exterior of the head to aperture 64. In a similar manner, brush 74 is connected to brush 80 on the rear face of the head by means of a conductor 88, being fitted into slots similar to those already described with reference to the other brush set. Brush 80, on the rear face of the rotor head, is adapted to cooperate with a ring-like plate 90 which embraces the shaft 54 and is fitted to the casing 56 by means of spider-like extensions 92 conveniently attached to the casing by being fitted into cooperating slots 94 and held therein by having portions of the casing upset. This forms a ground connection for the brush 80 which, in turn, grounds the brush 74 by means of the conductor 88 for purposes which we will describe in further detail hereinafter.

Figure 1:
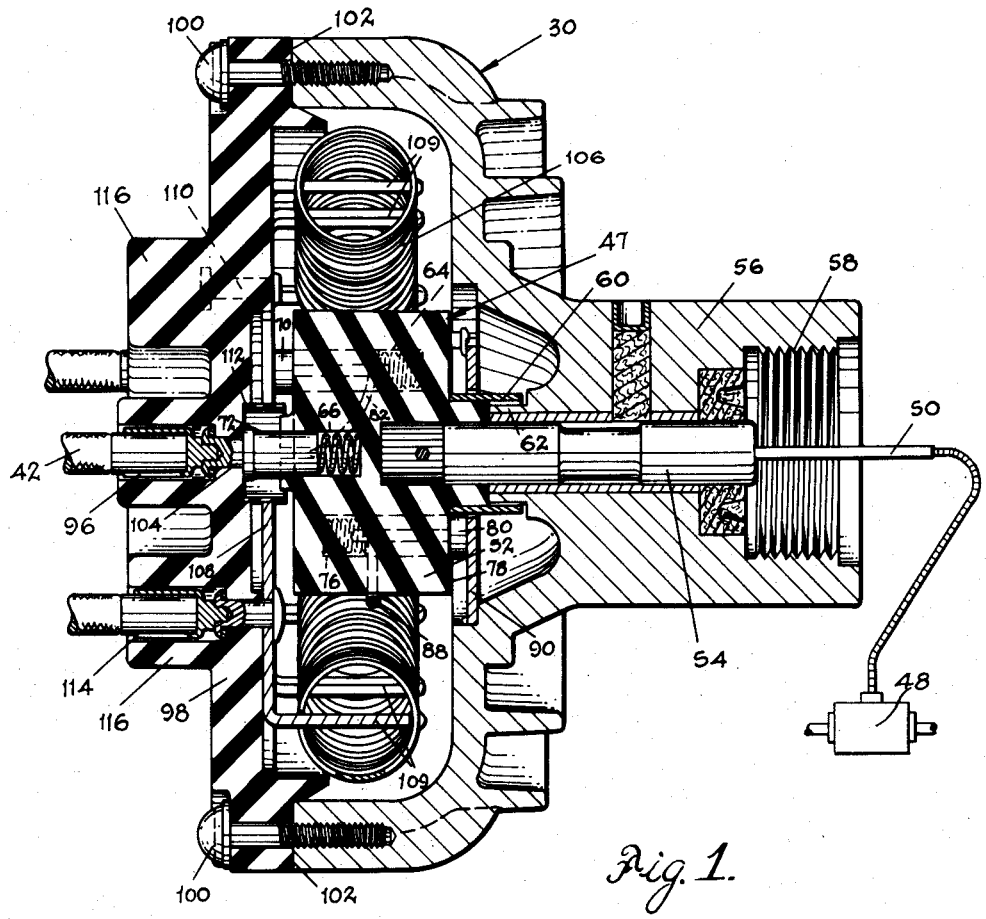
Fig. 1 is an elevational view in section of an apparatus incorporating the invention.

Brush 72, centrally located on the rotor 47, is placed in the electrical circuit as described with reference to Fig. 5 by being connected to conductor 42 which is in circuit with a connector 96 centrally positioned in an insulated closure member 98, attached to the open face of the casing 56 by means of screws 100, threaded into the forward face 102 of the casing member 56. The connector 96 is held in position and is in electrical connection with a contact rivet 104, the inner face of which abuts against the end of brush 72, as best shown in Fig. 1. As has been already described, brush 72 is in electrical connection with brush 70 by means of conductor 82, so that the brushes 72 and 70 are at the same electrical potential for purposes to be described hereinafter.

The construction of the rotor 47, as most clearly shown in Fig. 3, illustrates the aligned relation of brushes 70 and 74 on a line running through the axis of the shaft 54, so that the brushes 70 and 74 are positioned 180 mechanical degrees apart, which, in this case, is also 180 electrical degrees. It is to be understood that more brushes, such as 70 and 74, can be utilized if desired, provided they are positioned 180 electrical degrees apart, irrespective of their position with reference to the mechanical degrees. The brushes 70 and 74 are in effect by the circuit illustrated in Fig. 5—directly across the battery, so that the full electrical potential of the battery 40 could be measured across these two brushes. The purpose of translator 30 is to transpose the direct current as supplied by the battery 40 to the brushes 70 and 74 into a polyphase alternating current in order to provide a rotating field in the indicating device which will cause the rotor of the motor incorporated in this indicating devce to rotate in synchronism with the rotation of the rotor 47 under the influence of the shaft 50, as already described.

Figure 4:
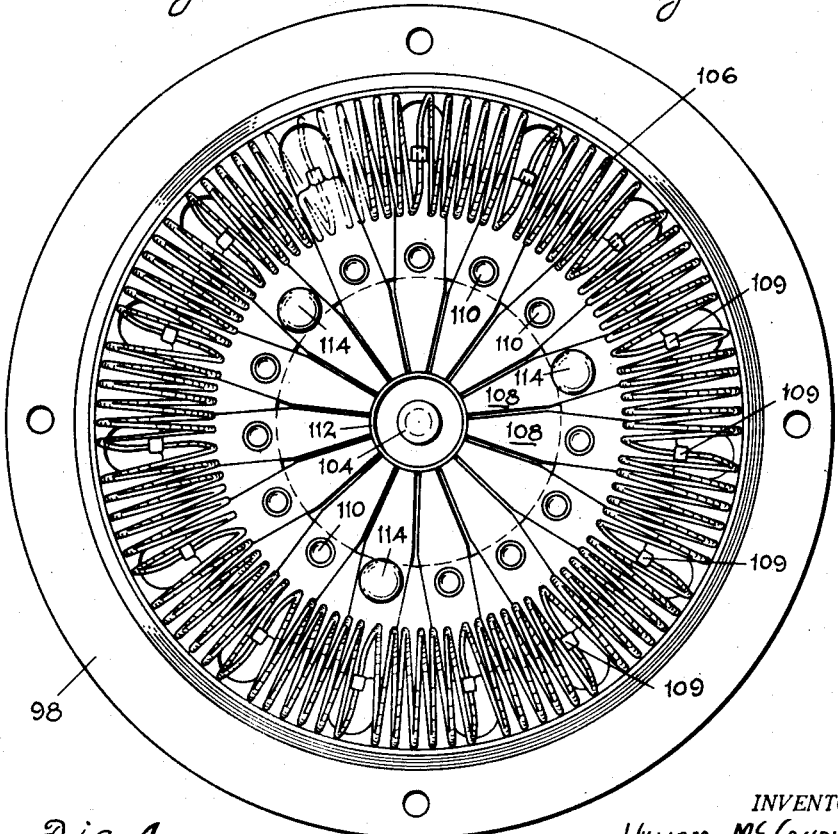
Fig. 4 is an elevational view of the rear of the cover.

For this purpose, a commutating device is provided, as best shown in Fig. 4, cooperating with a ring resistance 106 which is supported by and in electrical connection at spaced points by the individual commutator segments 108. Nibs 109 are provided on the individual commutator segments to cooperate with the ring resistance 106 at equidistant points in the ring resistance, so that the resistance wire, of which the ring resistance is formed, provides an equal resistance between each of the commutator segments 108 to provide a convenient radial commutator. To cooperate with the brushes 70 and 74, the individual segments 108 of the commutator may be arranged in several ways, one of which will be described in detail hereinafter.

In the construction of the commutator as shown in Fig. 4, the individual segments of the commutator are all mounted in a radial plane, with reference to the axis of rotation of head 47, being affixed for spaced relation to the inner surface of the insulating head 98, preferably by means of imbedded rivets 110. The inner end of the individual commutator segments adjacent the brush 72 are tapered so as to provide a parallel gap between the adjacent sides of the individual segments, so that the segments will each be insulated from each other. Adjacent the rivet 104, which is centrally located with reference to the segments 108, a ring of insulating material 112 is provided which shields the lower or inner faces of the individual segments adjacent the brush 72. It is highly advantageous to mount the brushes 70 and 74 on the rotating head 47 in such a manner that they will be as closely juxtaposed to the central axis of the shaft 54 as possible in order to reduce the peripheral speed at which the brushes rotate with reference to the fixed commutator segments 108. This substantially reduces brush wear and tends to give more satisfactory commutation between the brushes and the commutator segments.

In order to create the polyphase alternating currents which are desirable to create the rotating field in the electric motor at the indicating head, which will be described in detail hereinafter, three of the commutator segments 108, spaced 120 mechanical degrees apart and also 120 electrical degrees apart, are provided with connections 114 which extend through the end head 98, into insulating boss 116 where they are placed in connection with conductors 34, 36 and 38, as described with reference to Fig. 5. This construction is most clearly shown in Fig. 2 where the three connectors, incorporating the ring resistance, are shown in end view.

As a specific example in the details of construction of the translating device 30 for transforming D. C. current into polyphase A. C. current, the resistance of the ring 106 may vary from 9.45 ohms to 14.85 ohms which, when used in conjunction with the usual 6-volt automative type storage battery, will draw from 3.8 amperes to 2.6 amperes depending inversely on its resistance. The alternating current in the three separate phases will vary from 1.35 amperes to 1.15 amperes correspondingly. In the preferred construction, the resistance of the ring 106 is 14.85 ohms which will draw 2.6 amperes from the direct current battery, and will be translated into polyphase alternating currents with 1.15 amperes flowing in each of the phases when used in conjunction with the motor of the indicating device.

Referring again to Fig. 5, the leads 34, 36, and 38, which carry polyphase A. C. currents, are connected to an indicating device 200 which consists generally of an alternating current motor 202, which drives, by means of a shaft 204, a permanent magnet 206 of an eddy-current speedometer device which has a speed cup 208 and a field member. The speed cup is connected to a shaft 212, biased by hair spring 214 to drive a pointer 216, which cooperates with a dial member, to indicate to an observer the desired indications of miles per hour.

The three pole shoes create a rotating field by the three-phase alternating current which acts upon an armature, preferably a permanent magnet and may be of unitary or of laminated construction. The permanent magnet of the armature is preferably in the form of a truncated cylinder, or, if, desired, it may be left in the form of a simple cylinder, and is strongly magnetized as to be polarized, so that it will rotate in synchronism with the rotating field created by the field coils 260.

Fig. 5 shows a schematic diagram of connections of the complete device except that an electromagnet 346 is substituted for the permanent magnet of the motor 202. To energize the electromagnet, a slip ring 348 is also provided as shown.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

Reference is made to application Serial No. 83,327, filed March 25, 1949, which is a divisional application and claims inventions disclosed herein.

What is claimed is:

1. In an indicating device for an electric speedometer, a D. C. source of electrical energy, a driven rotor carrying two brushes in the forward face thereof, two contact brushes in said rotor in circuit with the first brushes and said source of energy, one of said contact brushes forming a ground connection, radial commutator means consisting of at least six segments fixedly mounted to cooperate with said driven rotor whereby said first brushes contact the segments thereof, resistance means connected between the segments of said commutator means to form a continuous ring resistance, three connectors connected to said segments substantially 120 degrees apart to create a three-phase alternating current having a rotating phase relation between the phases having a relation to the rotation of the driven rotor.

2. In an initiating device, a metallic cup-shaped housing having a central boss, a driven shaft journaled in the central boss, a head of insulating material fixed on said shaft and rotatable therewith, three brushes mounted on the forward face of said head on a line through the axis thereof one of said brushes being in electrical circuit with the central brush, a fourth brush mounted on the rear face of the head, a ring of conducting material mounted on the housing concentric with the shaft to cooperate with said fourth brush to form a ground connection therefor, said fourth brush being in electrical circuit with the other unconnected brush on the forward face of the head, an insulating cover attached to said cup at the lip thereof, radial conducting segments attached to the inner face of the cover and having inwardly extending lugs at their outer ends extending into the cup-shaped housing, coiled resistance wire connected to the lugs to form an endless ring of resistance, terminals connected to the segments spaced 120 degrees apart to form a three-phase connection, a central terminal in the cover connected to a source of D. C. current having one side grounded to cooperate with the central brush on the head whereby upon rotation of the head by the shaft a polyphase A. C. current is created at the terminals having a phase relation between the pases proportional to the rotation of the driven shaft.

3. In an initiating device, a metallic cup-shaped housing having a central boss, a driven shaft journaled in the boss, a head of insulating material fixed on said shaft and rotatable therewith, three brushes mounted on the forward face of said head on a line through a transverse axis thereof, one of said brushes being in electrical circuit with the central brush, the third brush being grounded through the housing, an insulating cover attached to said cup at the lip thereof, radial conducting segments attached to the inner face of the cover and having inwardly extending lugs at their outer end extending into the cup-shaped housing, coiled resistance wire connected to the lugs to form an endless ring of resistance within the housing, terminals positioned in the cover connected to the segments spaced 120 degrees apart to form a three-phase connection, a central terminal in the cover connected to one side of a grounded source of D. C. current to cooperate with the central brush on the head whereby upon rotation of the head by the driven shaft a polyphase A. C. current is created at the terminals having a phase relation between the phases proportional to the rotation of the driven shaft.

4. In an indicating device for an electric speedometer, a D. C. source of electrical energy, a driven rotor carrying two brushes in the forward face thereof, a pair of contact brushes in said rotor in circuit with said D. C. source of energy and said first brushes, one of said contact brushes forming a ground connection, radial commutator means consisting of at least six segments fixedly mounted to cooperate with said driven rotor whereby said first brushes contact the segments thereof in diametrically opposed relation, resistance means connected between the segments of said commutator means to form a continuous ring resistance positioned concentrically with the axis of rotation of the rotor in symmetrical relation therewith, three connectors connected to said segments substantially 120 degrees apart to create a three-phase alternating current having a rotating phase relation between the phases having a relation to the rotation of the driven rotor.

5. In an initiating device, a metallic cup-shaped housing having a central boss, a driven shaft journaled in the central boss, a head of insulating material fixed on said shaft and rotatable therewith, three brushes mounted on the forward face of said head on a line through the axis thereof one of said brushes being in electrical circuit with the central brush, a fourth brush mounted on the rear face of the head, a ring of conducting material mounted on the housing concentric with the shaft to cooperate with said fourth brush to form a ground connection therefor, said fourth brush being in electrical circuit with the other unconnected brush on the forward face of the head, an insulating cover attached to said cup at the lip thereof, radial conducting segments attached to the inner face of the cover and having inwardly extending lugs at their outer ends extending into the cup-shaped housing, coiled resistance wire connected to the lugs to form an endless ring of resistance positioned concentrically with the axis of rotation of the shaft, terminals connected to the segments spaced 120 degrees apart to form a three-phase connection, a central terminal in the cover connected to a source of D. C. current having one side grounded to cooperate with the central brush on the head whereby upon rotation of the head by the shaft a polyphase A. C. current is created at the terminals having a phase relation between the phases proportional to the rotation of the driven shaft.

6. In an initiating device, a metallic cup-shaped housing having a central boss, a driven shaft journaled in the central boss, a head of insulating material fixed on said shaft and rotatable therewith, three brushes mounted on the forward face of said head on a line through the axis thereof one of said brushes being in electrical circuit with the central brush, a fourth brush mounted on the rear face of the head, a ring of conducting material mounted on the housing concentric with the shaft to cooperate with said fourth brush to form a ground connection therefor, said fourth brush being in electrical circuit with the other unconnected brush on the forward face of the head, an insulating cover attached to said cup at the lip thereof, radial conducting segments attached to the inner face of the cover and having inwardly extending lugs at their outer ends extending into the cup-shaped housing, coiled resistance wire connected to the lugs to form an endless ring of resistance positioned concentrically with the axis of rotation of the shaft in the transverse plane of the head, terminals connected to the segments spaced 120 degrees apart to form a three-phase connection, a central terminal in the cover connected to a source of D. C. current having one side grounded to cooperate with the central brush on the head whereby upon rotation of the head by the shaft a polyphase A. C. current is created at the terminals having a phase relation between the phases proportional to the rotation of the driven shaft.

7. In an initiating device, a metallic cup-shaped housing having a central boss, a driven shaft journaled in the boss, a head of insulating material fixed on said shaft and rotatable therewith, three brushes mounted on the forward face of said head on a line through a transverse axis thereof, one of said brushes being in electrical circuit with the central brush, the third brush being grounded through the housing, an insulating cover attached to said cup at the lip thereof, radial conducting segments attached to the inner face of the cover and having inwardly extending lugs at their outer end extending into the cup-shaped housing, coiled resistance wire connected to the lugs to form an endless ring of resistance within the housing positioned concentrically with the axis of rotation of the shaft, terminals positioned in the cover connected to the segments spaced 120 degrees apart to form a three-phase connection, a central terminal in the cover connected to one side of a grounded source of D. C. current to cooperate with the central brush on the head whereby upon rotation of the head by the driven shaft a polyphase A. C. current is created at the terminals having a phase relation between the phases proportional to the rotation of the driven shaft.

8. In an initiating device, a metallic cup-shaped housing having a central boss, a driven shaft journaled in the boss, a head of insulating material fixed on said shaft and rotatable therewith, three brushes mounted on the forward face of said head on a line through a transverse axis thereof, one of said brushes being in electrical circuit with the central brush, the third brush being grounded through the housing, an insulating cover attached to said cup at the lip thereof, radial conducting segments attached to the inner face of the cover and having inwardly extending lugs at their outer end extending into the cup-shaped housing, coiled resistance wire connected to the lugs to form an endless ring of resistance within the housing positioned concentrically with the axis of rotation of the shaft in the transverse plane of the head, terminals positioned in the cover connected to the segments spaced 120 degrees apart to form a three-phase connection, a central terminal in the cover connected to one side of a grounded source of D. C. current to cooperate with the central brush on the head whereby upon rotation of the head by the driven shaft a polyphase A. C. current is created at the terminals having a phase relation between the phases proportional to the rotation of the driven shaft.

WILLIAM McCANDLESS.

REFERENCES CITED

The following references are of record in the file of this patent:

UNITED STATES PATENTS

| Number | Name | Date |
| --- | --- | --- |
| 885,394 | Strong | Apr. 21, 1908 |
| 899,629 | Shoemaker | Sept. 29, 1908 |
| 919,776 | Sanford | Apr. 27, 1909 |
| 986,299 | Lindemann et al. | Mar. 7, 1911 |
| 1,623,562 | Smithey | Apr. 5, 1927 |
| 1,670,836 | Berge | May 22, 1928 |
| 1,933,086 | Battegay | Oct. 31, 1933 |
| 2,042,334 | Fischer et al. | May 26, 1936 |
| 2,273,848 | Ely et al. | Feb. 24, 1942 |
| 2,377,284 | Welden | May 29, 1945 |

FOREIGN PATENTS

| Number | Country | Date |
| --- | --- | --- |
| 124,407 | Great Britain | Mar. 27, 1919 |
| 498,912 | Germany | May 28, 1930 |